Patented June 22, 1937

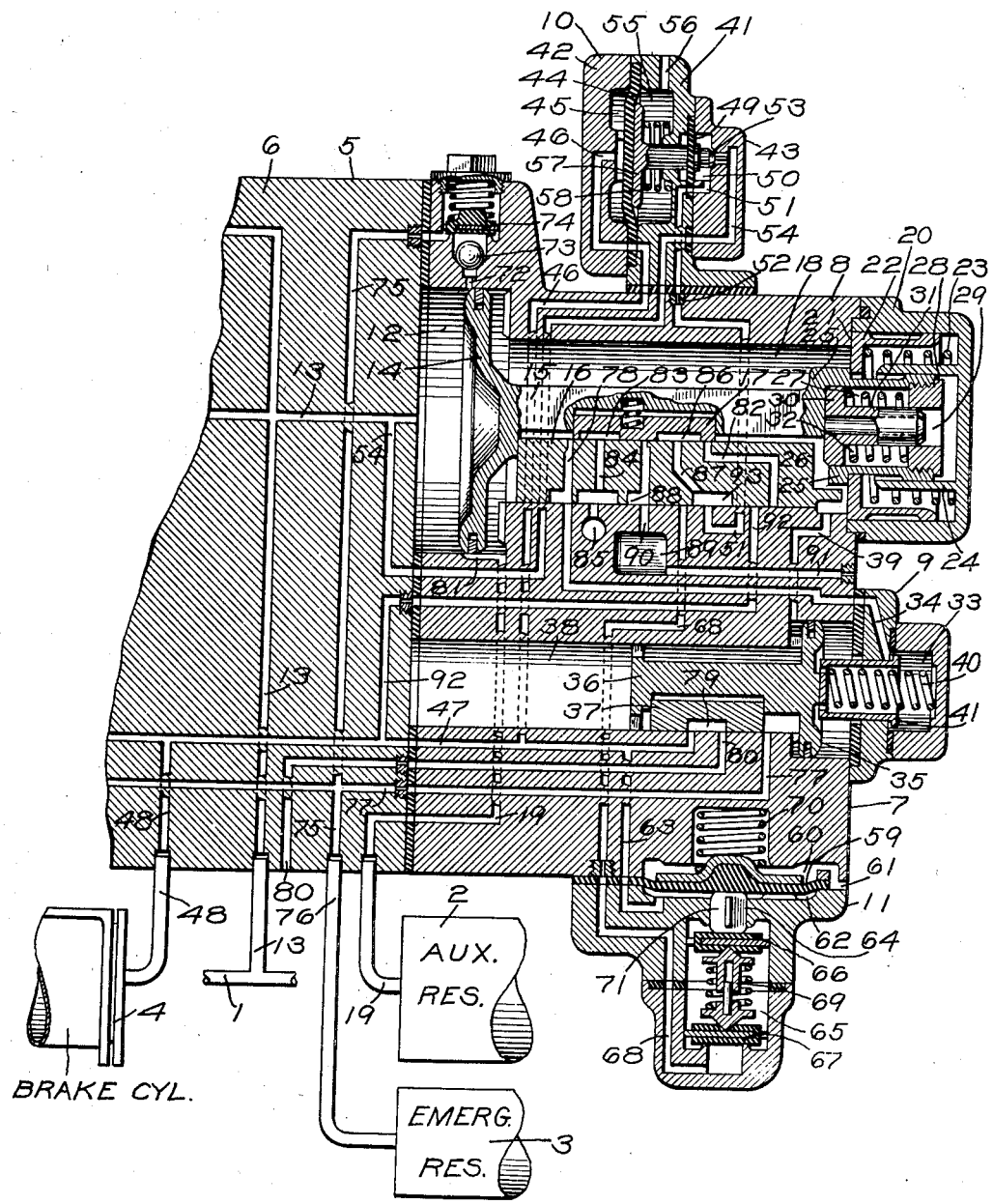

2,084,695

UNITED STATES PATENT OFFICE 2,084,695

FLUID PRESSURE BRAKE

Glenn T. McClure, McKeesport, and Ellery R. Fitch, Irwin, Pa., assignors to The Westinghouse Air Brake Company, Wilmerding, Pa., a corporation of Pennsylvania Application March 27, 1936, Serial No. 71,222

20 Claims. (Cl. 303—36)

This invention relates to fluid pressure brakes and more particularly to brake controlling apparatus which is adapted to be controlled to effect a graduated release of the brakes, such, for example, as the type of apparatus disclosed in either the patent of Ellis E. Hewitt, No. 2,032,172, or the joint application of Clyde C. Farmer and Ellis E. Hewitt, Serial No. 743,546, filed September 11, 1934.

In some classes of train service such, for instance, as passenger train service, in order to provide the desired smoothness and flexibility of control of the train, it is essential that the fluid pressure brake apparatus on the cars of the train be adapted to function to effect the graduated release of the brakes.

The means for graduating the release of the brakes is usually embodied in the equalizing or triple valve portion of the brake controlling apparatus in such a manner that the release of the brakes is controlled according to movement of the usual auxiliary slide valve relative to the main slide valve.

In some types of brake controlling apparatus, and especially in the apparatus disclosed in the two above mentioned pending applications, the auxiliary slide valve, in effecting an application of the brakes, moves relative to the main slide valve to effect a local quick service reduction in brake pipe pressure before the main slide valve is moved to a brake applying position.

If, after an application of the brakes has been effected, it is desired to graduate the release of the brakes, that is to say release the brakes in steps or increments, it is the usual practice for the engineer to first move the brake valve device to either release or running position to quickly increase the brake pipe pressure sufficiently to cause the several parts of the equalizing portion of the brake controlling apparatus on each car of the train to move to release position, and to then move the brake valve device to lap position, in which the supply of fluid under pressure to the brake pipe is cut off.

With the equalizing portion in release position, fluid under pressure is supplied from the emergency reservoir to the equalizing slide valve chamber through a communication which has been uncovered by the auxiliary slide valve. Now when the pressure of fluid in the equalizing valve chamber, which is being increased by the flow of fluid from the emergency reservoir and by the flow of fluid from the brake pipe through the usual feed groove around the equalizing piston, slightly exceeds brake pipe pressure which, with the brake valve device in lap position, is not increasing, the several parts of the equalizing portion move outwardly and cut off the flow of fluid from both the emergency reservoir and the brake pipe and also cut off the exhaust flow of fluid from the brake cylinder.

With the flow of fluid to the equalizing valve chamber cut off, the equalizing piston and auxiliary slide valve will, on a short train come to a stop before the auxiliary slide valve has been moved far enough to establish communication through which fluid under pressure is adapted to be locally vented from the brake pipe, however, there is a possibility, especially on the cars at the head end of a long train, of the auxiliary slide valve being unintentionally moved to the position in which it establishes the quick service venting communication. The conditions under which this unintentional quick service action may occur will now be briefly described.

When, in graduating the release of the brakes, the engineer moves the brake valve device to either running or release position, and as long as the brake valve device is in either of these two brake pipe charging positions, the brake pipe pressure on the cars at the head end of the train will, as is well known, be higher than that on the cars at the rear end of the train. Now when the brake valve device is moved to lap position and the supply of fluid under pressure to the brake pipe is thereby cut off, fluid in the brake pipe and consequently in the equalizing piston chambers on cars at the head end of the train, flows rapidly toward the rear end of the train causing a reduction in brake pipe pressure and in equalizing piston chamber pressure on the cars at the head end of the train. If this reduction in brake pipe pressure on one or more of the cars at the head end of the train is great enough that the pressure of fluid in the equalizing valve chamber will cause the equalizing piston and thereby the auxiliary slide valve to move to quick service position, fluid under pressure is locally vented from the brake pipe. The resulting quick service reduction in brake pipe pressure may then cause the several parts of the equalizing valve portion to move to application position in which fluid under pressure is supplied to the brake cylinder, thus instead of the brake cylinder pressure being decreased as is intended it may be increased. It will here be understood that when the equalizing portion on one or more of the cars at the head end of the train moves to quick service position such action is propagated from car to car throughout the length of the train, so that the brake cylinder pressure on each car of the train will be unintentionally increased.

The principal object of the invention is to provide a fluid pressure brake apparatus of the graduated release and quick service type which will be free from the aforementioned objectionable features.

Another object of the invention is to provide a fluid pressure brake apparatus of the graduated release and quick service type having means for preventing quick service flow of fluid from the brake pipe when in graduating the release of the brakes the brake apparatus unintentionally assumes quick service position.

Another object of the invention is to provide a fluid pressure brake controlling mechanism which is operative, in initiating an application of the brakes, to a quick service position in which fluid under pressure is vented from the brake pipe to effect a local reduction in brake pipe pressure, and operative to prevent the quick service venting of fluid from the brake pipe when in effecting a release of the brakes the mechanism assumes quick service position.

Another object of the invention is to provide a fluid pressure brake controlling valve mechanism comprising valve means operative in initiating an application of the brakes to establish a communication through which fluid under pressure is adapted to be vented from the brake pipe and also comprising means operative when an application of the brakes has been effected for preventing the flow of fluid from the brake pipe by way of said communication when in effecting a release of the brakes the valve means assumes the communication establishing position.

A further object of the invention is to provide a fluid pressure brake controlling mechanism comprising valve means operative in initiating an application of the brakes to establish a communication through which fluid under pressure is locally vented from the brake pipe and also comprising valve means operative when an application of the brakes is being effected for closing said communication.

Other objects and advantages will appear in the following more detailed description of the invention.

In the accompanying drawing, the single figure is a diagrammatic view, mainly in section, of a portion of a fluid pressure brake apparatus embodying the invention.

As shown in the drawing the brake controlling apparatus may comprise a brake pipe 1, an auxiliary reservoir 2, an emergency reservoir 3, a brake cylinder 4 and a brake controlling valve device 5.

In the present embodiment of the invention the brake controlling valve device may comprise a pipe bracket 6, an equalizing portion 7 attached to one side of the pipe bracket and an emergency portion (not shown) which may be attached to the opposite side of the pipe bracket.

The emergency portion of the brake controlling valve device 5 forms no part of the present invention and for this reason it has been omitted from the drawing and will not be described other than to say that it may be similar to the emergency portion disclosed in the aforementioned application of Ellis E. Hewitt, Serial No. 624,283.

The equalizing portion 7 may comprise an equalizing valve device 8, a relay valve device 9, a cut-off valve device 10 and a quick service modifying or limiting valve device 11.

The equalizing valve device 8 may comprise a casing having a piston chamber 12 which is connected through a passage and pipe 13 to the brake pipe 1. The chamber 12 contains a piston 14 having a stem 15 adapted to operate a main slide valve 16 and an auxiliary slide valve 17 contained in a valve chamber 18 which is connected through a passage and pipe 19 to the auxiliary reservoir 2.

As shown in the drawing the valve chamber 18 is closed at one end by a recessed cap 20. The recess of the cap is of greater diameter than that of the major portion of the valve chamber, and due to this, the rear end of the casing proper forms a stop shoulder 21 against which a stop member 22, slidably mounted in the cap 20, is adapted to abut to limit inward movement of the member 22. Interposed between and engaging the stop member 22 and cap 20 is a spring 23 which at all times tends to move the member 22 in the direction toward the stop shoulder 21.

The rear end portion of the piston stem 15 extends through a central opening in the stop member 22 and is slidably guided in an annular lug 24, preferably formed integral with the cap 20. The piston stem, at a point located a short distance inwardly from its rear end, is provided with a collar or lug 25, one side of which is adapted to be engaged by the stop member 22 and the other side of which is adapted to engage a rear end surface 26 of the main slide valve 16.

The rear end portion of the piston stem 15 is provided with a longitudinally extending bore 27 containing at one end a plug 28 which has screw-threaded connection with the stem and which is provided with a central bore 29. Below the lower surface of the major portion of the piston stem, the other end of the bore 27 is open to the valve chamber, and above this lower surface the inner end wall of the bore 27 forms a stop shoulder which is adapted to be engaged by a plunger 30 which is in slidable engagement with the piston stem within the bore 27. The plunger 30 is provided with a stem 31 which is slidably guided by the plug 28 within the bore 29. Interposed between and engaging one side of the plunger 30 and plug 28 is a spring 32 which acts to normally maintain the plunger in engagement with the end wall of the bore 27. In this position, the face of the plunger will be closer to the rear surface 26 of the main slide valve 16 than will be the outer face of the collar 25 of the piston stem, so that in effecting an application of the brakes, the plunger will engage the main slide valve and yieldably resist movement of the piston and auxiliary slide valve relative to the main slide valve before the collar 25 engages the main slide valve. The purpose of this is to stabilize the action of the several parts of the equalizing valve device against unintentional movement to quick service position until a predetermined reduction in brake pipe pressure is effected in initiating an application of the brakes. The stabilizing mechanism just described is of substantially the same construction and functions in the same manner as the stabilizing mechanism fully disclosed and broadly claimed in the patent to Clyde C. Farmer, No. 2,031,213.

The relay valve device 9 may comprise a casing which, in the present embodiment of the invention, is integral with the casing of the equalizing valve device. Formed in the casing is a piston chamber 33 which is connected to a passage 34 leading to the seat for the main equalizing slide valve 16, and which contains a piston 35 having a stem 36 adapted to operate a slide valve 37 contained in a chamber 38 which is in constant open communication through a passage 39 with the equalizing valve chamber 18. Also contained in the piston chamber 33 is a spring 40 which, acting through the medium of a plunger 41, slidably mounted in the casing, tends to urge the relay piston 35 toward the position in which it is shown in the drawing.

The cut-off valve device 10 is for the purpose of controlling the quick service communication from the brake pipe in the manner hereinafter more fully described and may comprise a casing which is secured to the casing of the equalizing valve device in any desired manner. The casing of this valve device 10 preferably comprises sections 41, 42 and 43, the section 41 being secured to the casing of the equalizing valve device and the sections 42 and 43 being respectively secured to opposite sides of the section 41.

Clamped between the casing sections 41 and 42 is a flexible diaphragm 44, at one side of which is a chamber 45 which is connected, through a passage 46, a passage 47 and a passage and pipe 48 to the brake cylinder 4. Clamped between the casing sections 41 and 43 is a flexible diaphragm 49, at one side of which is a chamber 50 which is connected to a quick service passage 51 leading from the seat for the equalizing main slide valve, which passage 51 has interposed therein a choke plug 52. Contained in the chamber 50 is a poppet valve 53 which is operative, through the medium of the diaphragm 49 to control communication between the chamber 50 and a quick service passage 54 leading from the brake pipe passage 13.

Between the flexible diaphragms 44 and 49 is a chamber 55 which is constantly connected, through a passage 56, to the atmosphere. Contained in this chamber and interposed between and operatively engaging the diaphragms is a follower member 57. Also contained in this chamber and interposed between and operatively engaging the follower member and the casing section 41 is a spring 58 which, at all times, tends to urge the follower member and diaphragm 44 toward their normal position, in which position they are shown in the drawing.

The quick service limiting or modifying valve device 11 is for the purpose of cutting off quick service flow of fluid from the brake pipe when, in effecting an application of the brakes, the brake cylinder pressure has been increased to about nine pounds. The construction and functions of this device are quite similar to those of the quick service limiting or modifying valve device fully disclosed in the aforementioned patent of Clyde C. Farmer, No. 2,031,213 and for this reason only a brief description of the device is deemed necessary in the present application. The device comprises a casing in which there is mounted a flexible diaphragm 59, at one side of which is a chamber 60 which is connected through a passage 61 to the atmosphere. At the other side of the diaphragm is a chamber 62 which is connected through a passage 63 to the brake cylinder passage 47. The chamber 62 is adapted to be connected through a port 64 in the casing to a chamber 65 containing a valve 66 which is controlled by the operation of the diaphragm to either establish or cut off communication between the chambers 62 and 65 by way of port 64. Also contained in the valve chamber 65 is a check valve 67 which is adapted to prevent back flow of fluid from the valve chamber 65 to a quick service passage 68 leading from the seat for the main equalizing main slide valve 16. Interposed between and operatively engaging the valve 66 and the check valve 67 is a spring mechanism 69 which is adapted to urge the check valve to its seat and which, at all times, tends to move the valve 66 toward its cut-off position. Normally the valve 66 is maintained open by means of a spring 70 which is contained in chamber 60 and which acts, through the medium of the diaphragm 59 and fluted stem 71, on the valve.

*Initial charging of the apparatus*

To initially charge the brake apparatus, fluid under pressure is supplied to the brake pipe 1 in the usual well known manner, and from the brake pipe, fluid under pressure flows, through pipe and passage 13, to the piston chamber 12 of the equalizing valve device and from thence, with the piston 14 of the equalizing valve device in release position, as shown in the drawing, flows through the usual feed groove 81 to the equalizing valve chamber 18. From the valve chamber 18 fluid under pressure flows through passage 19 to the auxiliary reservoir 2. Fluid under pressure flows from the piston chamber 12 to the emergency reservoir 3 by way of a passage 72, past two check valves 73 and 74, which are arranged in series, a choked passage 75 and a pipe 76. Fluid under pressure flows from the equalizing valve chamber 18, by way of passage 39 to the relay valve chamber 38 and from thence flows through a choked passage 77 to the passage 75 and consequently to the emergency reservoir. From the valve chamber 18 fluid under pressure flows to the relay piston chamber 33 by way of a restricted port 78 in the equalizing main slide valve and passage 34.

With the apparatus fully charged with fluid under pressure, the pressures of fluid on opposite sides of the piston 35 will be substantially equal so that the spring 40 acting through the medium of the plunger 41 maintains the piston and associated slide valve 37 in release position.

With the relay slide valve 37 in this position the brake cylinder 4 is connected to the atmosphere by way of pipe and passage 48, passage 47, a cavity 79 in the relay slide valve and a choked exhaust passage 80. Since the passage 46 is connected to the passage 47 the diaphragm chamber 45 of the cut-off valve device 10 will be at atmospheric pressure so that the spring 58 acting through the medium of the follower member 57 maintains the diaphragm flexed in the direction toward the left hand. The diaphragm 49 is subject to fluid under pressure from the brake pipe and is flexed in the same direction, so that the cut-off valve 53 is normally open as shown in the drawing.

*Application of the brakes*

When it is desired to effect an application of the brakes, a reduction in brake pipe pressure is effected in the usual well known manner, which causes a reduction in the pressure of fluid in the piston chamber 12 of the equalizing valve device. Fluid at auxiliary reservoir pressure in the equalizing valve chamber 18 now causes the piston 14 and thereby the auxiliary slide valve 17 to move outwardly relative to the main slide valve 16. The piston upon its initial movement closing the feed groove 81 and the emergency reservoir charging passage 72, and the slide valve in its corresponding movement uncovering a service port 82 and bringing a cavity 83 into position to establish communication from the port 78 to a port 84 in the equalizing main slide valve 76 which is connected to a passage 85 leading to the atmosphere. Since the port 78 is in communication with the passage 34, fluid under pressure is now vented from the relay piston chamber 33 to the atmosphere.

With the relay piston chamber 33 vented fluid at auxiliary reservoir pressure in the relay valve chamber 38 causes the piston and thereby the relay slide valve 37 to move outwardly against the opposing pressure of the spring 40, the slide valve in its movement lapping the passage 77 thereby cutting off communication between the emergency reservoir and the relay valve chamber 38 and equalizing valve chamber 18, and lapping the brake cylinder passage 47 thereby cutting off the communication from the brake cylinder to the atmospheric passage 80.

When the auxiliary slide valve 17 has been moved to establish communication from the relay piston chamber 33 to the atmosphere as just described, the plunger 30 engages the rear end surface 26 of the main slide valve 16, so that the further outward movement of the piston and auxiliary slide valve 16 is resisted by the stabilizing spring 32 acting on the plunger. It will here be understood that the frictional resistance of the main slide valve toward application position is such that the valve will remain stationary until the collar 25 of the piston stem 15 engages the rear end surface 26 of the valve, so that the spring 32 will be compressed.

As the spring 32 is being compressed a cavity 86 in the auxiliary slide valve connects two quick service ports, 87 and 88, in the main slide valve 16 together, so that fluid under pressure is now vented from the brake pipe to a small quick service chamber 89 by way of passages 13 and 54, past the unseated cut-off valve 53 of the device 10, chamber 50, passage 51, port 87 in the main slide valve, cavity 86 in the auxiliary slide valve, port 88 in the main slide valve and a passage 90. In the present embodiment of the invention the quick service chamber 39 is always open to the atmosphere by way of a choked passage 91 so as to continue the local reduction in brake pipe pressure to insure the equalizing piston 14 and associated slide valves moving to application position if for any reason these parts do not move to application position by the time the brake pipe pressure equalizes into the chamber.

When the collar 25 of the piston stem 15 has been brought into engagement with the rear end surface 26 of the main slide valve 16, the collar, as the piston continues to move outwardly, will cause the main slide valve to move to application position in which the service port 82, which has been previously uncovered by the auxiliary slide valve, registers with a choked application passage 92 which is connected to the brake cylinder passage 47. Fluid under pressure now flows from the equalizing valve chamber 18 and connected auxiliary reservoir 2 to the brake cylinder 4 by way of the service port 82, passages 92 and 47 and passage and pipe 48. From the brake pipe passage 47 fluid under pressure also flows through passage 46 to the diaphragm chamber 45 of the cut-off valve device 10.

With main slide valve 16 in application position, a tail cavity 93 of the port 87 connects the quick service passage 51 to the quick service passage 68, so that fluid under pressure is now vented from the brake pipe to the brake cylinder by way of pipe and passage 13, passage 54, past the valve 53 of the cut-off valve device 10, chamber 50, passage 51, cavity 93 in the main slide valve, passage 68, past the check valve 67 of the quick service limiting or modifying valve device 11, valve chamber 65, past the unseated valve 66, port 64, diaphragm chamber 62, passages 63 and 47 and passage and pipe 48. When the brake cylinder pressure has been increased to about nine pounds fluid at brake cylinder pressure in chamber 62 of the quick service limiting or modifying valve device causes the diaphragm 59 to flex upwardly against the opposing action of the spring 70, permitting the spring mechanism 69 to act to seat the valve 66 thereby cutting off the quick service flow of fluid from the brake pipe to the brake cylinder. When the brake cylinder pressure has been increased to about ten pounds or any other pressure in excess of the pressure required to cause the quick service limiting or modifying valve device 11 to function to cut off the flow of fluid from the brake pipe to the brake cylinder, fluid at brake cylinder pressure in the diaphragm chamber 45 of the cut-off valve device 10 causes the diaphragm 44 to flex in a direction toward the right hand shifting the follower member 57 in the same direction against the opposing action of the spring 58.

The follower member 57 as it is thus shifted flexes the diaphragm 49 in the same direction and thereby seats the cut-off valve 53. With the valve 53 thus seated it will be maintained seated as long as the brake cylinder pressure is in excess of ten pounds.

It will here be understood that the initial quick service flow of fluid from the brake pipe to the quick service chamber 89 is for the purpose of propagating quick service action to the brake controlling apparatus on the adjacent car of a train and that the slow venting of fluid from the brake pipe to the atmosphere by way of said chamber and the passage 91 is to ensure movement of the several parts of the local equalizing valve device to application position in the event of the device failing to move to this position after substantial equalization of the brake pipe into the chamber 89. It will also be understood that the final quick service flow of fluid from the brake pipe to the brake cylinder is for the purpose of insuring the several parts of the equalizing valve device remaining in application position until the brake cylinder pressure has been increased to about nine pounds regardless of the brevity of the brake pipe reduction at the brake valve or brake cylinder piston travel. From this it will be seen that the quick service characteristics of the apparatus in effecting an application are identical with those disclosed and broadly claimed in the aforementioned patent of Clyde C. Farmer, No. 2,031,213.

Since the cut-off valve device 10 does not function to close the quick service communication until after the quick service limiting or modifying valve device operates to cut off the quick service flow of fluid from the brake pipe to the brake cylinder it is obvious that the cut-off valve device will in no way interfere with the normal quick service action of the apparatus in effecting an application of the brakes.

*Graduated release of the brakes*

When it is desired to graduate the release of the brakes, that is to say release the brakes in steps or increments, the engineer first moves the brake valve device to either running or release position and then to lap position as many times as he deems necessary to properly release the brakes. Each time the brake valve device is moved to either running or release position the brake pipe pressure is increased in the usual well known manner and each time the brake valve device is moved from either of these positions to lap position the flow of fluid to the brake pipe is cut off.

When the brake valve device is moved to either running or release position the resulting increase in brake pipe pressure in the equalizing piston chamber causes the piston 14 and thereby the auxiliary and main slide valves 17 and 16, respectively, to move to their normal release position as shown in the drawing or to an inner release position, in either of which release positions the supply of fluid from the auxiliary reservoir to the brake cylinder is cut off by the equalizing slide valves 16 and 17 in the usual manner. With the equalizing piston 14 in release position, fluid under pressure flows from the equalizing piston chamber 12 through the feed groove 81 to the equalizing slide valve chamber 18, connected auxiliary reservoir 2, and relay slide valve chamber 38. With the slide valves 16 and 17 in either release position the port 78 in the main slide valve is open to the equalizing slide valve chamber 18 so that fluid under pressure flows from said chamber 18 through the port 78 and passage 34 to the relay piston chamber 33. When the pressure of fluid in chamber 33 has been increased to substantially that of the pressure of fluid in the relay slide valve chamber 38, the spring 40 and plunger 41 act to shift the relay piston 35 and thereby the relay slide valve 37 to release position in which the cavity 79 in the valve 37 connects the brake cylinder passage 47 to the exhaust passage 80 so that fluid under pressure is vented from the brake cylinder to the atmosphere. The relay slide valve in its movement to release position uncovers the passage 77, so that fluid under pressure from the fully charged emergency reservoir 3 flows through said passage to the relay slide valve chamber 38 and from said chamber flows through passage 39 to the equalizing slide valve chamber 18, thus increasing the pressure in each of the valve chambers.

Now when the pressure of fluid in the equalizing slide valve chamber and acting on one side of the equalizing piston slightly exceeds the increased brake pipe pressure acting on the other side of the piston, the piston and thereby the auxiliary slide valve 17 are caused to move outwardly relative to the main slide valve 16, the piston, as it thus moves, closing the feed groove 81 and the auxiliary slide valve in its movement first lapping the port 78 in the main slide valve thereby cutting off the flow of fluid from the equalizing slide valve chamber to the relay piston chamber 33 and then connecting the ports 78 and 84 in the main slide valve. With these ports thus connected fluid under pressure is vented from the relay piston chamber 33 to the atmosphere. Fluid under pressure in the relay slide valve chamber 38 now causes the relay piston 35 and thereby the slide valve 37 to move to their outermost position, the slide valve as it is thus moved lapping the passages 77 thereby cutting off the flow of fluid from the emergency reservoir 3 to the relay valve chamber 38 and equalizing slide valve chamber 18. The slide valve 37 as it is moved also laps the brake cylinder passage 47 thereby cutting off the exhaust flow of fluid from the brake cylinder to the atmosphere.

Since, with the passage 77 lapped, no further increase in pressure of fluid in the equalizing valve chamber occurs, the equalizing piston 14 and therefore the auxiliary slide valve 17 will come to a stop before the slide valve is moved a sufficient distance to establish the initial quick service communication.

When it is desired to further decrease brake cylinder pressure the brake valve device is first turned to either running or release position and then to lap position and under the influence of the resulting increase in brake pipe pressure the apparatus will function as just described to release fluid under pressure from the brake cylinder.

It is well known that with the brake valve device in either running or release position, the brake pipe pressure on cars at the head end of a train will be increased at a faster rate than on cars at the rear end of the train, and that when the brake valve device is moved from either running or release position to lap position brake pipe fluid on cars at the head end of the train will flow toward the rear end of the train. This flow of fluid toward the rear end of the train of course causes a reduction in the pressure of fluid in the brake pipe on the head end of the train, the degree of reduction depending upon the length of the train.

On a train of such a length that the reduction in brake pipe pressure on the cars at the head end of the train, due to the flow of brake pipe fluid from the front end of the train toward the rear thereof, may be so great that the pressure of fluid in the equalizing valve chamber 18 will not permit the equalizing piston 14 and auxiliary slide valve to come to a stop as intended, but may cause them to continue to move to initial quick service position in which the cavity 86 in the slide valve establishes communication between the quick service ports 87 and 88 in the main slide valve 16.

When this occurs fluid under pressure is vented from the brake pipe to the quick service chamber 89 and through the quick service chamber to the atmosphere by way of the choked passage 91. Since the equalizing piston cannot now operate to move the auxiliary slide valve 17 rearwardly out of its quick service position the brake pipe pressure continues to reduce by the flow of fluid to the atmosphere by way of the choked passage 81, so that the equalizing piston and auxiliary slide valve are caused to move to application position, thus the brake cylinder pressure will be increased when a decrease is desired.

According to the invention this undesired action cannot occur for the reason that when an application of the brakes is being effected, the cut-off valve device 10 functions to close communication from the brake pipe 1 to the seat for the equalizing main slide valve 16 and to maintain the communication closed until the brake cylinder pressure has been reduced to such a low degree that no further release graduations are necessary or desirable.

It will be understood that since the cut-off valve device 10 prevents the quick service flow of fluid from the brake pipe when in graduating the release of the brakes the auxiliary slide valve 17 of the equalizing valve device is accidentally moved to quick service position, the tendency of the equalizing valve device to continue to move to application position is effectively prevented.

While one illustrative embodiment of the invention has been described in detail, it is not our intention to limit its scope to that embodiment or otherwise than by the terms of the appended claims.

Having now described our invention, what we claim as new and desire to secure by Letters Patent, is:

1. In a fluid pressure brake, in combination, a brake pipe, a graduated release brake controlling valve mechanism operative upon a reduction in brake pipe pressure at a service rate to locally vent fluid under pressure from the brake pipe and to effect an application of the brakes and operative upon an increase in brake pipe pressure to effect a release of the brakes, and means operative to prevent fluid from being vented from the brake pipe upon movement of the brake controlling valve mechanism to brake pipe venting position in releasing the brakes.

2. In a fluid pressure brake, in combination, a brake pipe, a graduated release brake controlling valve mechanism operative upon a reduction in brake pipe pressure at a service rate to locally vent fluid under pressure from the brake pipe and to effect an application of the brakes and operative upon an increase in brake pipe pressure to effect a release of the brakes, and means conditioned in the application position of the brake controlling valve mechanism to prevent fluid under pressure from being locally vented from the brake pipe upon movement of the brake controlling valve mechanism to brake pipe venting position in releasing the brakes.

3. In a fluid pressure brake, in combination, a brake pipe, a graduated release brake controlling valve mechanism operative upon a reduction in brake pipe pressure at a service rate to locally vent fluid under pressure from the brake pipe and to effect an application of the brakes and operative upon an increase in brake pipe pressure to effect a release of the brakes, and means conditioned by fluid under pressure adapted to be supplied through a communication established by the brake controlling valve mechanism in its application position to prevent fluid under pressure from being locally vented from the brake pipe upon movement of the brake controlling valve mechanism to brake pipe venting position in releasing the brakes.

4. In a fluid pressure brake, in combination, a brake pipe, a brake cylinder, a graduated release brake controlling valve mechanism operative upon a reduction in brake pipe pressure to first establish a communication through which fluid under pressure is locally vented from the brake pipe and to then supply fluid under pressure to the brake cylinder to effect an application of the brakes and operative upon an increase in brake pipe pressure in steps or increments to cause fluid under pressure to be released from the brake cylinder in corresponding steps or increments, and means responsive to a light brake cylinder pressure to close said communication to prevent the local venting of fluid from the brake pipe upon movement of the brake controlling valve mechanism to brake pipe venting position in graduating the release of the brakes.

5. In a fluid pressure brake, in combination, a brake pipe, a brake cylinder, a graduated release brake controlling valve mechanism operative upon a reduction in brake pipe pressure to first establish a communication through which fluid under pressure is locally vented from the brake pipe and to then supply fluid under pressure to the brake cylinder to effect an application of the brakes and operative upon an increase in brake pipe pressure in steps or increments to cause fluid under pressure to be released from the brake cylinder in corresponding steps or increments, a normally open valve past which fluid under pressure locally vented from the brake pipe is adapted to flow, and means operative by fluid being supplied to the brake cylinder for closing said valve to prevent the flow of fluid from the brake pipe upon movement of the brake controlling valve mechanism to brake pipe venting position in graduating the release of the brakes.

6. In a fluid pressure brake, in combination, a brake pipe, a graduated release brake controlling valve mechanism operative upon a reduction in brake pipe pressure to establish a communication through which fluid under pressure is adapted to be locally vented from the brake pipe and to effect an application of the brakes and operative upon an increase in brake pipe pressure to effect a release of the brakes, a valve closing said communication during the release of the brakes, and means for maintaining said valve in its communication closing position until the brake application has been released to a low degree.

7. In a fluid pressure brake, in combination, a brake pipe, a brake cylinder, a graduated release brake controlling valve mechanism operative upon a reduction in brake pipe pressure to establish a communication through which fluid under pressure is adapted to be locally vented from the brake pipe and for effecting the supply of fluid under pressure to the brake cylinder to effect an application of the brakes, and operative upon an increase in brake pipe pressure in steps or increments to effect the release of fluid under pressure from the brake cylinder in steps or increments, a valve past which fluid under pressure is locally vented from the brake pipe is adapted to flow and operative to close said communication, and means for operating said valve to close said communication and to maintain it in communication closing position until the brake cylinder pressure has been reduced to a low degree.

8. In a fluid pressure brake, in combination, a brake pipe, a brake cylinder, a graduated release brake controlling valve mechanism operative upon a reduction in brake pipe pressure to establish a communication through which fluid under pressure is adapted to be locally vented from the brake pipe and for effecting the supply of fluid under pressure to the brake cylinder to effect an application of the brakes, and operative upon an increase in brake pipe pressure in steps or increments to effect the release of fluid under pressure from the brake cylinder in steps or increments, a valve past which fluid under pressure is locally vented from the brake pipe is adapted to flow and operative to close said communication, and means responsive to a predetermined low brake cylinder pressure for operating said valve to close said communication and for maintaining the valve in its communication closing position so long as the brake cylinder pressure is in excess of said predetermined low brake cylinder pressure.

9. In a fluid pressure brake, in combination, a brake pipe, a quick service communication leading from the brake pipe, a plurality of other quick service communications, a brake controlling valve device operative upon a reduction in brake pipe pressure to first establish communication from the first mentioned quick service communication to one of said other quick service communications to locally vent fluid under pressure from the brake pipe and to then effect an application of the brakes and to establish communication from the first mentioned quick service communication to another of said other quick service communications to locally vent fluid under pressure from the brake pipe, said brake controlling valve mechanism being operative upon an increase in brake pipe pressure to release the brakes, and means operative to close the first mentioned communication to prevent fluid under pressure from being locally vented from the brake pipe when in releasing the brakes the brake controlling valve mechanism establishes communication between the first and second mentioned quick service communications.

10. In a fluid pressure brake, in combination, a brake pipe, a brake cylinder, a quick service passage connected to the brake pipe, two other quick service passages to each of which the first mentioned passage is adapted to be connected to vent fluid under pressure from the brake pipe, a brake controlling valve mechanism operative upon a reduction in brake pipe pressure for connecting the first mentioned quick service passage to one of the said two quick service passages to initially vent fluid under pressure from the brake pipe and for then supplying fluid under pressure to the brake cylinder and for connecting the first mentioned quick service passage to the other of the said two quick service passages to vent fluid under pressure from the brake pipe, said brake controlling valve mechanism being operative upon an increase in brake pipe pressure to release fluid under pressure from the brake cylinder, means responsive to a light brake cylinder pressure to cut off the quick service flow of fluid through the last mentioned quick service passage, and means responsive to a slightly higher brake cylinder pressure for closing said passage to prevent local flow of fluid from the brake pipe when in effecting a release of fluid under pressure from the brake cylinder the brake controlling valve mechanism operates to connect together the first and second mentioned quick service passages.

11. In a fluid pressure brake, in combination, a brake pipe, a brake cylinder, a quick service chamber, a quick service passage connected to said chamber, a second quick service passage connected to the brake cylinder, a third quick service passage connected to the brake pipe, a brake controlling valve mechanism operative upon a reduction in brake pipe pressure to supply fluid under pressure to the brake cylinder and to sequentially connect the third quick service passage to the other two quick service passages in the order in which they are named to locally vent fluid under pressure from the brake pipe, said brake controlling valve mechanism being operative upon an increase in brake pipe pressure to release fluid under pressure from the brake pipe, means responsive to a predetermined brake cylinder pressure for cutting off the flow of fluid from the brake pipe to the brake cylinder through the said second passage, means responsive to a brake cylinder pressure in excess of said predetermined pressure for closing the third mentioned passage to prevent the flow of fluid from the brake pipe upon movement of the brake controlling valve device to connect the passage with the first mentioned passage in effecting a release of the brakes.

12. In a fluid pressure brake, in combination, a brake pipe, a brake controlling valve mechanism operative upon a reduction in brake pipe pressure to vent fluid under pressure from the brake pipe and to effect an application of the brakes and operative upon a series of increases in brake pipe pressure to graduate the release of the brakes, a valve past which fluid vented from the brake pipe is adapted to flow, and means for closing said valve to prevent fluid under pressure from being vented from the brake pipe upon movement of the brake controlling valve mechanism to brake pipe venting position in graduating the release of the brakes.

13. In a fluid pressure brake, in combination, a brake pipe, a brake cylinder, a brake controlling valve mechanism operative upon a reduction in brake pipe pressure first to a quick service position to locally vent fluid under pressure from the brake pipe and then to an application position to locally vent fluid under pressure from the brake pipe and to supply fluid under pressure to the brake cylinder and operative upon an increase in brake pipe pressure to effect a release of the brakes, a valve past which fluid under pressure vented from the brake pipe is adapted to flow with the brake controlling valve mechanism in each of said brake pipe venting positions, and means for operating said valve to prevent the flow of fluid from the brake pipe upon movement of the brake controlling valve mechanism to said quick service position in releasing the brakes.

14. In a fluid pressure brake, in combination, a brake pipe, a brake cylinder, a brake controlling valve mechanism operative upon a reduction in brake pipe pressure first to a quick service position to locally vent fluid under pressure from the brake pipe and then to an application position to locally vent fluid under pressure from the brake pipe and to supply fluid under pressure to the brake cylinder and operative upon an increase in brake pipe pressure to effect a release of the brakes, a valve past which fluid under pressure vented from the brake pipe is adapted to flow with the brake controlling valve mechanism in each of said brake pipe venting positions, and means responsive to brake cylinder pressure for closing said valve to prevent the flow of fluid under pressure from said brake pipe when, in releasing the brakes, the brake controlling valve mechanism assumes said quick service position.

15. In a fluid pressure brake, in combination, a brake pipe, a brake controlling valve mechanism comprising a main slide valve, an auxiliary slide valve movable relative to the main slide valve for locally venting fluid under pressure from the brake pipe and a movable abutment operative upon a reduction in brake pipe pressure for moving said auxiliary slide valve to its brake pipe venting position and for then moving both of said slide valves to supply fluid under pressure to effect an application of the brakes and operative upon an increase in brake pipe pressure to move both of said valves to effect a release of the brakes, and valve means operative to prevent local venting of fluid from the brake pipe when, in releasing the brakes, the auxiliary slide valve is moved from release position to brake pipe venting position.

16. In a fluid pressure brake, in combination, a brake pipe, a brake controlling valve mechanism comprising a main slide valve, an auxiliary slide valve movable relative to the main slide valve for locally venting fluid under pressure from the brake pipe and a movable abutment operative upon a reduction in brake pipe pressure for moving said auxiliary slide valve to its brake pipe venting position and for then moving both of said slide valves to supply fluid under pressure to effect an application of the brakes and operative upon an increase in brake pipe pressure to move both of said valves to effect a release of the brakes, and valve means operative by fluid under pressure supplied by the brake controlling valve mechanism in effecting an application of the brakes for preventing local venting of fluid from the brake pipe when, in releasing the brakes, the auxiliary slide valve is moved from release position to brake pipe venting position.

17. In a fluid pressure brake, in combination, a brake pipe, a brake cylinder, a brake controlling valve device operated upon a reduction in brake pipe pressure for first venting fluid under pressure from the brake pipe to the atmosphere and for then supplying fluid under pressure to the brake cylinder and also for locally venting fluid under pressure from the brake pipe to the brake cylinder, and means operative upon a predetermined increase in brake cylinder pressure for cutting off communication through which said valve device vents fluid from the brake pipe to the atmosphere.

18. In a fluid pressure brake, in combination, a brake pipe, a brake cylinder, a brake controlling valve device including a main valve and a graduating valve having a movement relative to the main valve and operated upon a reduction in brake pipe pressure for supplying fluid under pressure to the brake cylinder, and also operative upon movement of the graduating valve relative to the main valve for venting fluid from the brake pipe, and means operative upon a predetermined increase in brake cylinder pressure for cutting off communication through which fluid is vented from the brake pipe by operation of the graduating valve relative to the main valve.

19. In a fluid pressure brake, in combination, a brake pipe, a brake cylinder, a brake controlling valve device operated upon a reduction in brake pipe pressure to a position for venting fluid under pressure from the brake pipe to the atmosphere and then to a position for supplying fluid under pressure to the brake cylinder, and means operative upon a predetermined increase in brake cylinder pressure for cutting off, between the brake pipe and the brake controlling valve device, communication through which said valve device vents fluid from the brake pipe to the atmosphere.

20. In a fluid pressure brake, in combination, a brake pipe, a brake cylinder, a brake controlling valve device operated upon a reduction in brake pipe pressure to a position for venting fluid under pressure from the brake pipe and then to a position for supplying fluid under pressure to the brake cylinder and also for venting fluid under pressure from the brake pipe, and means responsive to brake cylinder pressure for cutting off communication through which fluid is adapted to be vented from the brake pipe when the brake controlling valve device is in the first mentioned position.

GLENN T. McCLURE.
ELLERY R. FITCH.